(12) United States Patent
Gupta et al.

(10) Patent No.: US 8,184,647 B2
(45) Date of Patent: May 22, 2012

(54) NETWORK ELEMENT CONFIGURATION SCHEME

(75) Inventors: Rajarshi Gupta, Santa Clara, CA (US); Amer Catovic, San Diego, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 12/490,117

(22) Filed: Jun. 23, 2009

(65) Prior Publication Data

US 2010/0002603 A1 Jan. 7, 2010

Related U.S. Application Data

(60) Provisional application No. 61/077,354, filed on Jul. 1, 2008.

(51) Int. Cl.
*H04L 12/28* (2006.01)

(52) U.S. Cl. ............. 370/401; 370/338; 370/236.2; 370/252

(58) Field of Classification Search .............. None
See application file for complete search history.

(56) References Cited

U.S. PATENT DOCUMENTS

| | | | |
|---|---|---|---|
| 6,729,929 B1 | 5/2004 | Sayers et al. | |
| 2003/0161268 A1* | 8/2003 | Larsson et al. | 370/229 |
| 2006/0099987 A1 | 5/2006 | Singh et al. | |
| 2008/0232310 A1* | 9/2008 | Xu | 370/329 |
| 2010/0135174 A1* | 6/2010 | Mori | 370/252 |
| 2010/0144313 A1* | 6/2010 | Chun et al. | 455/410 |

FOREIGN PATENT DOCUMENTS

| | | |
|---|---|---|
| WO | WO0217665 A1 | 2/2002 |
| WO | WO2008025874 A1 | 3/2008 |
| WO | WO2008030171 A2 | 3/2008 |
| WO | WO2008053688 A1 | 5/2008 |

OTHER PUBLICATIONS

International Search Report and Written Opinion—PCT/US2009/049400, International Search Authority—European Patent Office—Aug. 21, 2009.

NTT DOCOMO: "Clarification of functions for self-optimization and self-configuration" 3rd Generation Partnership Project (3GPP); Technical Specification Group (TSG) Radio Access Network (RAN); Working Group 3 (WG3), No. R3-061509, Oct. 13, 2006, pp. 1-3, XP002477484.

* cited by examiner

*Primary Examiner* — Duc C Ho (74) *Attorney, Agent, or Firm* — François A. Pelaez (57) ABSTRACT

In a configuration scheme for one or more network elements, a network management entity determines a set of at least one parameter value from a set of operable parameter values and sends the determined set to a network element. The network element then selects a parameter value from the received set and uses the selected parameter value to configure one or more aspects of the network element.

45 Claims, 9 Drawing Sheets

FIG. 10

NETWORK ELEMENT CONFIGURATION SCHEME

CLAIM OF PRIORITY UNDER 35 U.S.C. §119

This application claims the benefit of and priority to commonly owned U.S. Provisional Patent Application No. 61/077,354, filed Jul. 1, 2008, the disclosure of which is hereby incorporated by reference herein.

BACKGROUND

1. Field

This application relates generally to wireless communication and more specifically, but not exclusively, to configuring network elements.

2. Introduction

Wireless communication systems are widely deployed to provide various types of communication (e.g., voice, data, multimedia services, etc.) to multiple users. In a typical system, base stations are distributed throughout geographical areas to provide local wireless connectivity for mobile units that roam through those areas. The base stations, in turn, communicate with core network nodes provide wide area network connectivity. In addition, the base stations communicate with network nodes that manage the network and may comprise an operation, administration and maintenance entity (also referred to as an operation and maintenance entity or an operation, administration, management and maintenance entity; hereafter referred to as the OAM) that communicates with network elements (e.g., base stations) over management interfaces to perform management functions, including configuration management, fault management and performance management.

As the demand for high-rate and multimedia data services rapidly grows, there lies a challenge to implement efficient and robust communication systems with enhanced performance, including self-configuration capabilities. For example, a network element, such as the base station, may autonomously optimize one or more radio parameters. Accordingly, there is a need for improved techniques for configuring these and other types of network elements.

To supplement conventional mobile phone network base stations, small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem. In practice, these small-coverage base stations may be deployed in an ad-hoc manner and in relatively large numbers. Consequently, there is a need for improved techniques for configuring such base stations.

SUMMARY

A summary of sample aspects of the disclosure follows. It should be understood that any reference to the term aspects herein may refer to one or more aspects of the disclosure.

The disclosure relates in some aspect to a scheme for configuring a network element. Such a network element may comprise, for example, an access point, an access terminal, or some other entity deployed in a network.

In some aspects a network management entity determines a set of at least one parameter value from a set of operable parameter values and sends the determined set to a network element. The network element may then select a parameter value from the received set and use the selected parameter value to configure some aspect of the network element.

As a further example, in a self-organizing network, certain parameters may be configured by access points (e.g., eNodeBs). To enable the core network to have some control over the parameter value selected by an access point, a network management entity may configure a valid set of values for such a parameter. The network element may then configure itself by selecting a value from this set (e.g., using an appropriate algorithm for selecting an optimum parameter from the set).

BRIEF DESCRIPTION OF THE DRAWINGS

These and other sample aspects of the disclosure will be described in the detailed description and the appended claims that follow, and in the accompanying drawings, wherein:

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Figure 1:
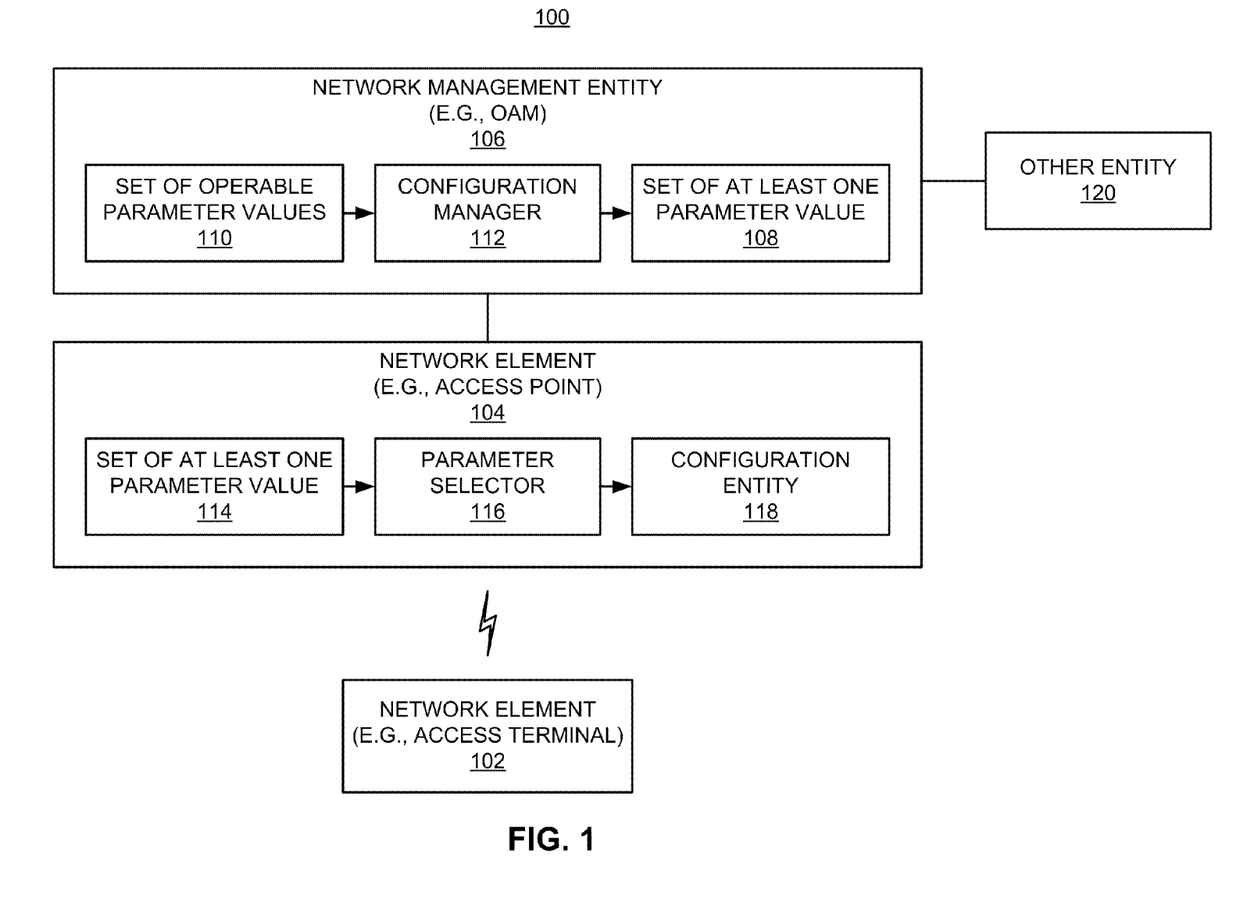
FIG. 1 is a simplified block diagram of several sample aspects of a communication system where a network element is configured based on a set of parameter values received from a network node.

FIG. 1 illustrates several nodes of a sample communication system 100 (e.g., a portion of a communication network). For illustration purposes, various aspects of the disclosure will be described in the context of one or more network management entities (e.g., network nodes such as OAMs) and network elements (e.g., access points and access terminals) and that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobiles, and so on.

Access point network elements in the system 100 may provide one or more services (e.g., network connectivity) for one or more access terminal network elements that may be installed within or that may roam throughout an associated geographical area. In the example of FIG. 1, at some point in time a network element 102 may be served by a network element 104. The network element 104 may, in turn, communicate with one or more network management entities (represented, for convenience, by network management entity 106) to facilitate wide area network connectivity. A network management entity may take various forms such as, for example, one or more core network entities (e.g., a network node providing OAM functionality, a mobility management entity, or some other suitable network entity).

In accordance with the teachings herein, the network element 104 is autoconfigurable in that it may autonomously select one or more parameter values that it uses during operation. In addition, to enable a network operator to maintain a level of control over the parameter values selected by the network element 104, the network management entity 106 may specify which parameters values of a set of available parameter values may be used by the network element 104. It should be appreciated that this network element configuration scheme may be applicable to other types of network elements (e.g., the network element 102).

Figure 4:
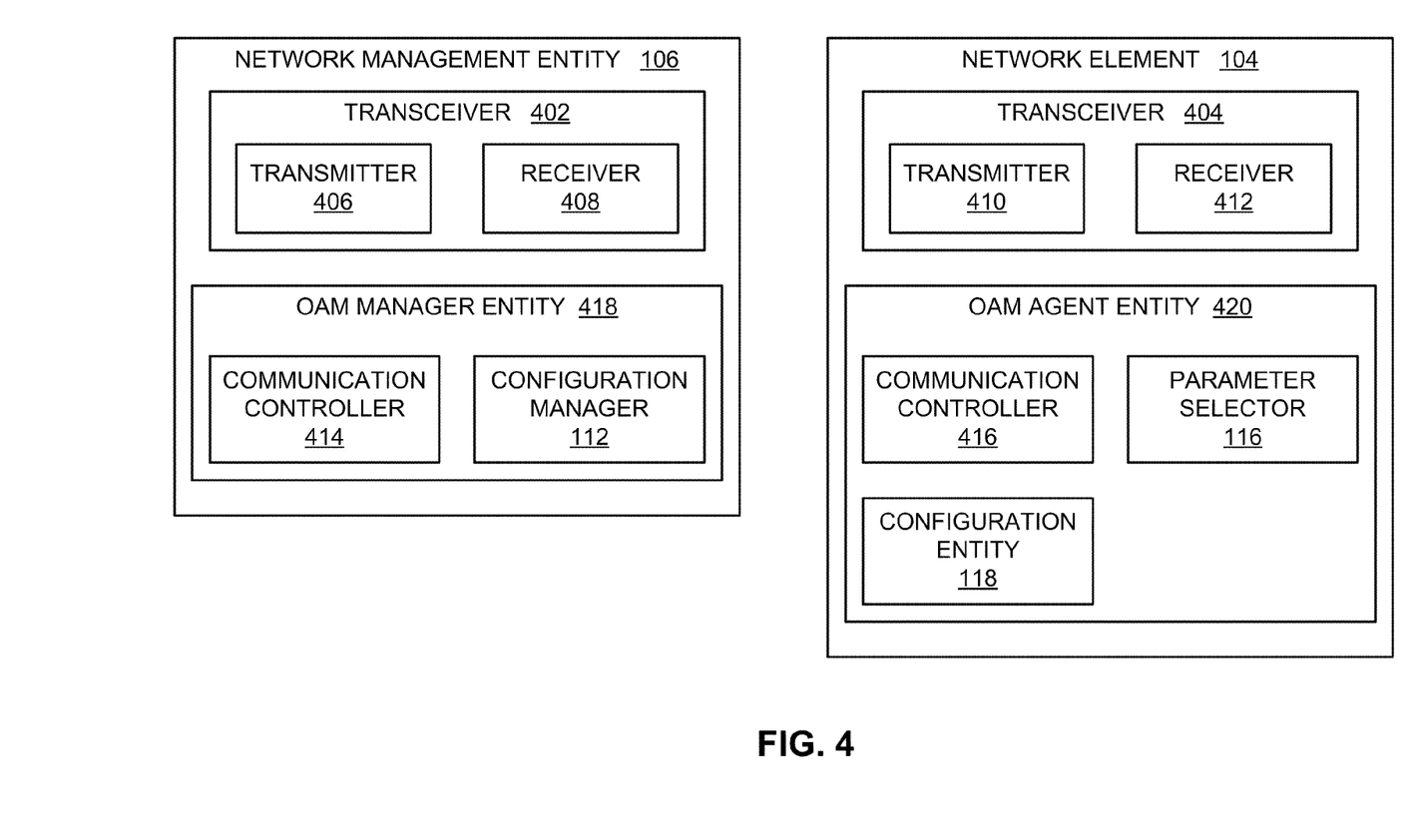
FIG. 4 is a simplified block diagram of several sample aspects of components that may be employed in communication nodes.

Sample operations of the system 100 will now be discussed in more detail in conjunction with the flowchart of FIG. 2. For convenience, the operations of FIG. 2 (or any other operations discussed or taught herein) may be described as being performed by specific components (e.g., components of the system 100 or as shown in FIG. 4). It should be appreciated, however, that these operations may be performed by other types of components and may be performed using a different number of components. It also should be appreciated that one or more of the operations described herein may not be employed in a given implementation.

Figure 2:
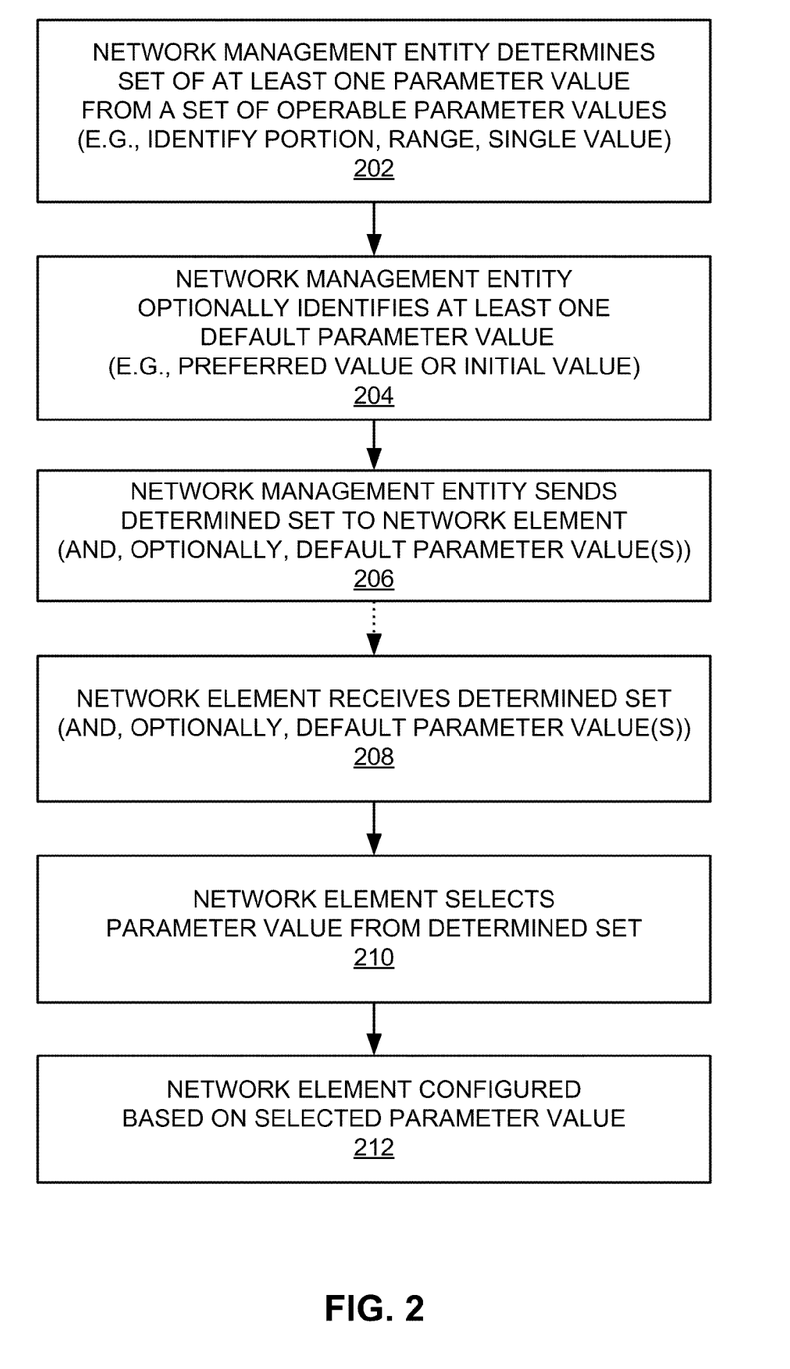
FIG. 2 is a flowchart of several sample aspects of operations that may be performed to configure a network element based on a set of parameter values received from a network node.

As represented by block 202 of FIG. 2, the network management entity 106 determines a set comprising at least one parameter value 108 from a set of operable parameter values 110. As mentioned above, the network management entity 106 may perform OAM functions at the network level. Such OAM functions may include, for example, one or more of configuration management, fault management, performance management, software management, system management, inventory management, or subscription management. Of particular interest here are the configuration management function (e.g., which may configure a parameter value set as taught herein) and the fault management function (e.g., which may receive and process notifications that indicate that a parameter value set is invalid). In the example of FIG. 1, these operations may be performed by one or more configuration managers as represented by a configuration manager 112.

The set of operable parameter values 110 may relates to various operational aspects of the network element 104. For example, the set 110 may relates to radio parameters, mobility parameters, power control parameters, or any other suitable parameters used by the network element 104.

In some aspects, the set 110 may specify the parameter values that are available for use by a network element in a given network. In some implementations the set 110 may be defined by a communication standard (e.g., as in LTE). As one example, maximum transmit power for a network element may be specified to be between 10 mW and 10 W. As another example, the number of node identifiers (e.g., physical cell identifiers) that are available to be assigned to access points in the system may be limited to 504.

In some situations a network operator may wish to control the operations of an autoconfigurable network element to some extent by limiting the parameter values that may be selected by the network element. That is, rather than let network elements select any value in an allowed range (set 110), the network may elect to restrict the range that may be selected by one or more of the network elements (e.g., permanently, or under certain conditions, or at certain times). A decision to provide a restricted set may be based on, for example, information concerning the network that is known at the core network, network (e.g., operator) policy, or some other factor or factors.

The set 108 may be defined in various ways. In some cases the set 108 may comprise a portion of the set 110. In some cases the set 108 may be equal to the set 110.

In some cases the set 108 may comprise a set of enumerated values or ranges (e.g., not necessarily continuous values). In these cases, the network element 104 has the flexibility to select any value for a parameter from the specified set of enumerated values or ranges. For example, a parameter may be allowed to take any values in the set {value1, value2, value3, . . . value9} for set 110. The network management entity 106 may then configure this parameter to any value from the set {value3, value4, value5} to provide the set 108.

In cases where a parameter may take values in a continuous range, the network management entity 106 may specify the set 108 as a range of values. For example, such a set may be specified by one or more of: all of the values in the range, the beginning of the range (e.g., minimum range value), the end of the range (e.g., maximum range value), or the width of the range). In these cases, the network element 104 has the flexibility to select any value for the parameter within the specified range.

In some cases the set 108 may comprise a single value. For example, a set with one element may be specified. Alternatively, depending on the characteristics of the parameter, a parameter range may be specified with a width of 0 (e.g., the minimum value of the range is set equal to the maximum value of the range). In these cases, the network management entity 106 may specify the exact value that the network element 104 will select.

In some implementations the network management entity 106 may cooperate with one or more other entities (represented in FIG. 1, for convenience, as other entity 120) to determine the set 108. For example, to produce the parameter value set the network management entity 106 may engage one or more: external entities, algorithms, tools, or applications. A specific example of such an entity includes commercial network planning tools, which may contain parameter planning and configuration modules. In this case, the network management entity 106 may send a request including appropriate input information (e.g., the set 110) to the other entity 120 and receives back the set 108. The network management entity 106 may then configure the set 108 in the network element 104 as discussed below.

As represented by block 204, the network management entity 106 (e.g., the configuration manager 112) may identify one or more default parameter values from the set 108. In some cases the default parameter value comprises an initial or preferred parameter value that the network element may use in the event the network element does not select a parameter value. In some cases such a default parameter may be used if better parameter information is not available to the network element 104 (e.g., if an optimization algorithm run by the network element does not identify an optimum parameter value). In some cases the network element 104 may initiate operations using an initial parameter value and then move to an alternate value (from the set 108) if later specified by a local algorithm.

As a specific example of a default value, the set 108 may comprise a list of valid operating channels (e.g., channel frequencies). In this case, the network management entity 106 may select one of these channels as a preferred channel based on some criterion or criteria (e.g., interference on the other channels) known at the network management entity 106. Here, the criterion or criteria employed by the network management entity 106 may be static (e.g., a preconfigured criterion) or dynamic (e.g., a criterion based on current network conditions as detected by the network management entity 106).

As represented by block 206, the network management entity 106 sends the determined set of at least one parameter value 108 (e.g., sends one or more indications from which one or more values of the set may be derived) to the network element 104. It should be appreciated that one or more network elements may be configured through the use of one or more determined sets. For example, in some cases the network management entity 106 may send the same determined set to multiple network elements. In some cases the network management entity 106 may send different determined sets to different network elements.

In addition, there may be other network management entities in a given network that configure these and/or other network elements in that network through the use of determined sets as taught herein. For example, the different network management entities may be responsible for OAM functions in different network domains (e.g., one entity per domain). Here, a network domain may represent, for example, a geographic region, a set of network elements manufactured by the same vendor, or a set of network elements that use the same radio access technology (e.g., an LTE domain, a UMTS domain, and so on). Thus, in some implementations a network management entity may comprise a domain management layer entity. In addition, in some implementations a network management entity may manage one or more domain management layer entities.

The network management entity 106 also may send one or more default parameter values to the network element in conjunction with sending the determined set 108. Here, a default parameter value may be sent in the same message as or a different message than the determined set 108.

As represented by block 208, the network element 104 receives the determined set and one or more default values, if applicable (e.g., receives one or more indications of the determined parameter values). As shown in FIG. 1, the network element 104 may maintain a copy of the received parameter set 114 (e.g., in a data memory).

As represented by block 210, the network entity 104 (e.g., a parameter selector 116) selects a parameter value from the set 114 for use in configuration operations. A parameter value may be selected from the parameter value set 114 in various ways depending on the requirements of a given application. In a typical case, the network entity 104 executes an optimization algorithm that attempts to identify a suitable parameter from the set 114. Here, various criteria may be used by the optimization algorithm depending on the parameters being configured, the network element being configured, and the deployed network (e.g., network configuration and conditions). Alternatively, in some cases a parameter value may be selected from the set 114 in a round-robin manner. In other cases a parameter value may be selected from the set 114 in a random manner.

As represented by block 212, the network entity 104 is configured based on the selected parameter value. For example, a configuration entity 118 (e.g., comprising a configuration manager) may initialize or change a parameter value (e.g., by writing to a data memory) used by one or more components of the network entity 104. As a specific example, a wireless transceiver of the network entity 104 may be configured with a radio parameter (e.g., maximum power, node identifier, etc).

In some cases, in conjunction with this configuration, the network element 104 may send a report back to the network management entity 106 that indicates the selected parameter value and that the network element 104 has been configured with that parameter value.

The teachings herein are applicable to various types of parameters. For explanatory purposes, several examples of how a parameter value may be selected follow.

Maximum transmit power for a network element such as an access point (e.g., associated with a particular cell) is an example wherein it may be beneficial for a network management entity such as an OAM to configure a parameter value set. The value of this power parameter determines, for example, the range of an access point, and also the interference the access point may impart on its neighbors. Thus, this parameter may be advantageously suited for local optimization.

Here, rather than let access points select any maximum transmit power in the allowed range, the network may elect to constrain certain access points. As a specific example, a network operator may decide that macro cells that are installed in a dense urban area should be assigned a maximum transmit power of up to 5 W while macro cells that are installed in a rural area environment should be allowed to transmit up to the maximum transmit power allowed by the applicable standard (e.g., up to 10 W). Conversely femto cells may be restricted to a maximum transmit power of up to 100 mW.

Upon receiving an indication of a maximum transmit power parameter value set from the OAM, the access point may select a specific value from the set. For example, this decision may be based on feedback that the access point receives from neighboring network elements (e.g., access points).

A physical cell identifier ("PCID") for a network element such as an access point is another example where it may be beneficial for a network management entity such as an OAM to configure a parameter value set. The PCID of an access point (e.g., of a cell) is used to determine the pilot sequence that the access point broadcasts. This pilot sequence is used by access terminals to gather enough information to be able to access the access point. It is therefore important that no two neighboring access points broadcast the same PCID (this situation may be referred to as a "PCID Collision"), otherwise the access terminals would be unable to decode the PCID. In a planned macro network, this is achieved through careful planning. However, in a network with many small access points (e.g., femto nodes, pico nodes) deployed in an ad-hoc manner, a more practical deployment scheme is to have the access points self-configure their PCID.

Here, it may be desirable for a portion of the PCID space to be reserved for use by these smaller cells (femto or pico cells). For example, 50 out of 504 available PCIDs may be reserved for smaller cells. In this way, PCID collisions between planned macro cells and the unplanned smaller cells may be avoided. Accordingly, the OAM may configure this smaller set of PCIDs for the access points associated with the smaller cells. Then, based on the PCID selection algorithm deployed at these access points, an access point may choose one of the PCIDs from this smaller set. Thus, the PCID space is another example of a parameter where a subset (e.g., range) is configured by the network management entity, and the exact value is chosen by the network element following a distributed, localized algorithm.

A handover parameter for a network element such as an access point is another example of a parameter for which it may be beneficial for a network management entity such as an OAM to configure a parameter value set. For example, an access terminal may measure the received signal strength of a signal from a serving access point (a first network element) and a signal from a neighboring access point (a second network element). A timer may be started when the signal from the neighboring access point exceeds the signal from the serving access point by a defined offset. The access terminal may then report an event (e.g., via a measurement report) when the timer expires. Here, the parameters for the offset and the timeout period may be specified to the access terminal by the serving access point. In turn, these parameters may be configured at the serving access point by an OAM. As a specific example, in a self-optimizing network, the OAM may configure parameter value sets for these parameters where the offset may range from 2 dB to 4 dB with a suggested value of 3 dB, and where the timeout period is one of the enumerated values {320 ms, 640 ms} with a suggested value of 320 ms. Here, the serving access point may initially use the suggested values. However, depending on the handover performance of its access terminals, the serving access point may make a local decision and select different parameter values (using the values from the parameter value sets).

The teachings herein may be implemented in different ways in different implementations. For example, FIG. 3 describes operations relating to determining whether a parameter value set is valid (blocks 304-310) and determining whether to use a default parameter value (blocks 312-320) that may be performed in conjunction with configuring a network element. For convenience, these operations are shown in the same flowchart. In practice, however, either one or both of these operations may not be used in a given implementation.

Figure 3:
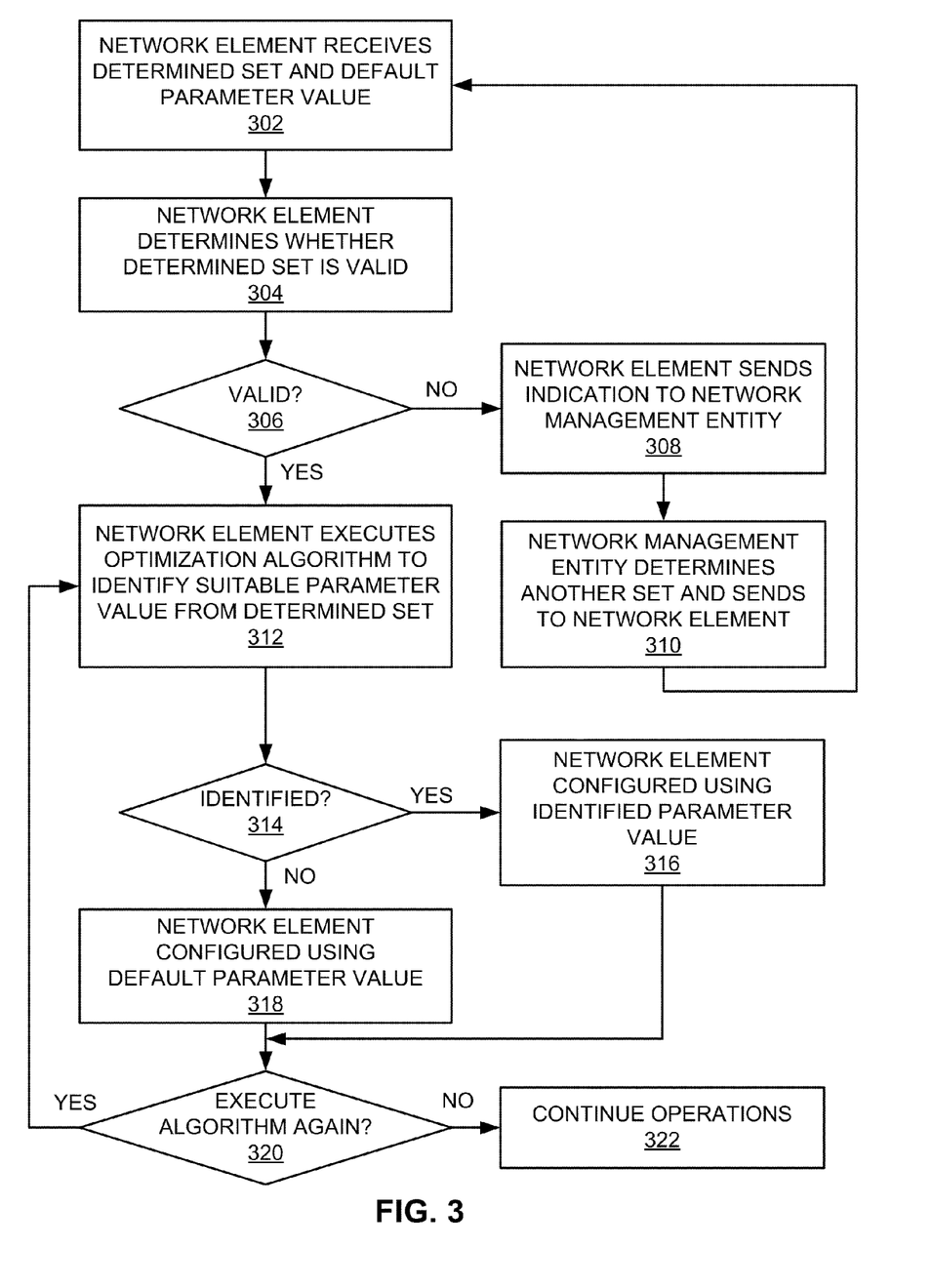
FIG. 3 is a flowchart of several sample aspects of operations that may be performed to configure a network element.

As represented by block 302, the network element receives the parameter value set and a default parameter value as discussed above at block 208.

As represented by block 304, the network element 104 (e.g., the parameter selector 116) determines whether the received parameter value set is valid. For example, based on current network conditions as determined by the network element 104 (e.g., a wireless receiver), the network element 104 may determine that it is not possible or desirable to use any of the parameter values (e.g., PCID, transmit power, channel, etc.) specified by the received parameter value set.

As represented by blocks 306 and 308, in the event the received parameter value set is deemed invalid, the network element 104 sends a report to the network management entity 106 including an indication that the network element 104 considers the parameter value set to be invalid. Upon receiving this report, the network management entity 106 may elect to determine another set 108 and send this new set to the network element (block 310). The operational flow may then proceed back to block 302.

In the event the received parameter value set is deemed valid at block 306, the network element 104 may proceed with the configuration operations.

As represented by block 312, in some cases the network element 104 may execute an optimization algorithm to identify a suitable parameter value from the received parameter value set 114 as discussed above. As represented by blocks 314 and 316, in the event a suitable value is identified, the network element 104 may be configured using that parameter value as discussed at block 212.

On the other hand, if a suitable value is not identified by the optimization algorithm, the network element 104 (e.g., the parameter selector 116) may be configured using the default parameter value (block 318). Thus, in this case, the selection of a parameter value from the set comprises selecting the default parameter.

As represented by blocks 320 and 322, the optimization algorithm may be executed once (block 322) or on a repeated basis (continuing back to block 312). As example of the latter case, the algorithm may be executed periodically or triggered by some event (e.g., a received RF signal or a need to transmit a signal). In this way, the configuration parameters of the network element 104 may be updated over time in an attempt to achieve optimal performance.

In some implementations the functionality of blocks 208-212 of FIG. 2 and the blocks of FIG. 3 may be performed by a sub-network level OAM agent entity implemented in a network element. For example, in a macro eNodeB such an entity may be implemented as an IRP agent, while in a Home eNodeB such an entity may be implemented as a TR-069 agent. Thus, in this case, a configuration management entity of the sub-network OAM may receive the parameter value set from the network management entity 106 and configure the set in the network element. In addition, a fault management entity of the sub-network OAM may send a notification (e.g., alarm) to the network management entity 106 if the received parameter set is invalid.

FIG. 4 illustrates several sample components that may be incorporated into nodes such as the network management entity 106 and the network element 104 to perform network element configuration operations as taught herein. The described components also may be incorporated into other nodes in a communication system. For example, other nodes in a system (e.g., network element 102) may include components similar to those described for the network element 104 to provide similar functionality. A given node may contain one or more of the described components. For example, a network element may contain multiple transceiver components that enable the network element to operate on multiple frequencies and/or communicate via different technology.

As shown in FIG. 4, the network management entity 106 and the network element 104 may include transceivers 402 and 404, respectively, for communicating with other nodes. The transceiver 402 includes a transmitter 406 for sending signals (e.g., configuration messages) and a receiver 408 for receiving signals. Similarly, the transceiver 404 includes a transmitter 410 for sending signals (e.g., report messages) and a receiver 412 for receiving signals. Depending on the connectivity between the nodes of FIG. 4, the transceiver 402 and/or the transceiver 404 may support different communication technologies (e.g., wired or wireless).

The network management entity 106 and the network element 104 also include other components that may be used in conjunction with network element configuration operations as taught herein. For example, the network management entity 106 and the network element 104 may include communication controllers 414 and 416, respectively, for managing communication with other nodes (e.g., sending and receiving messages/indications) and for providing other related functionality as taught herein. As a specific example, the communication controller 414 may generate one or more messages to send the defined set 108 (and optionally one or more default parameter values) to the network element 104. Conversely, the communication controller 416 may receive and process these messages. Similarly, the communication controller 416 may generate messages (e.g., report messages) and send these messages to the network management entity 106 where they are received and processed by the communication controller 414.

Also, also discussed above, the nodes 104 and 106 may comprise OAM entities that perform one or more of the functions described herein. For example, the network management entity 106 may comprise an OAM manager entity 418 and the network element 104 may comprise an OAM agent entity 420.

In some aspects the teachings herein may be employed in a self-organizing network or other type of network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal ("AT") moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience). In addition, as there may be a large number of these smaller coverage nodes in the network, it may prove advantageous to have these nodes be self-organizing at least to some extent.

In the description herein, a node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage (e.g., coverage within a commercial building) over an area that is smaller than a macro area and larger than a femto area. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

Figure 5:
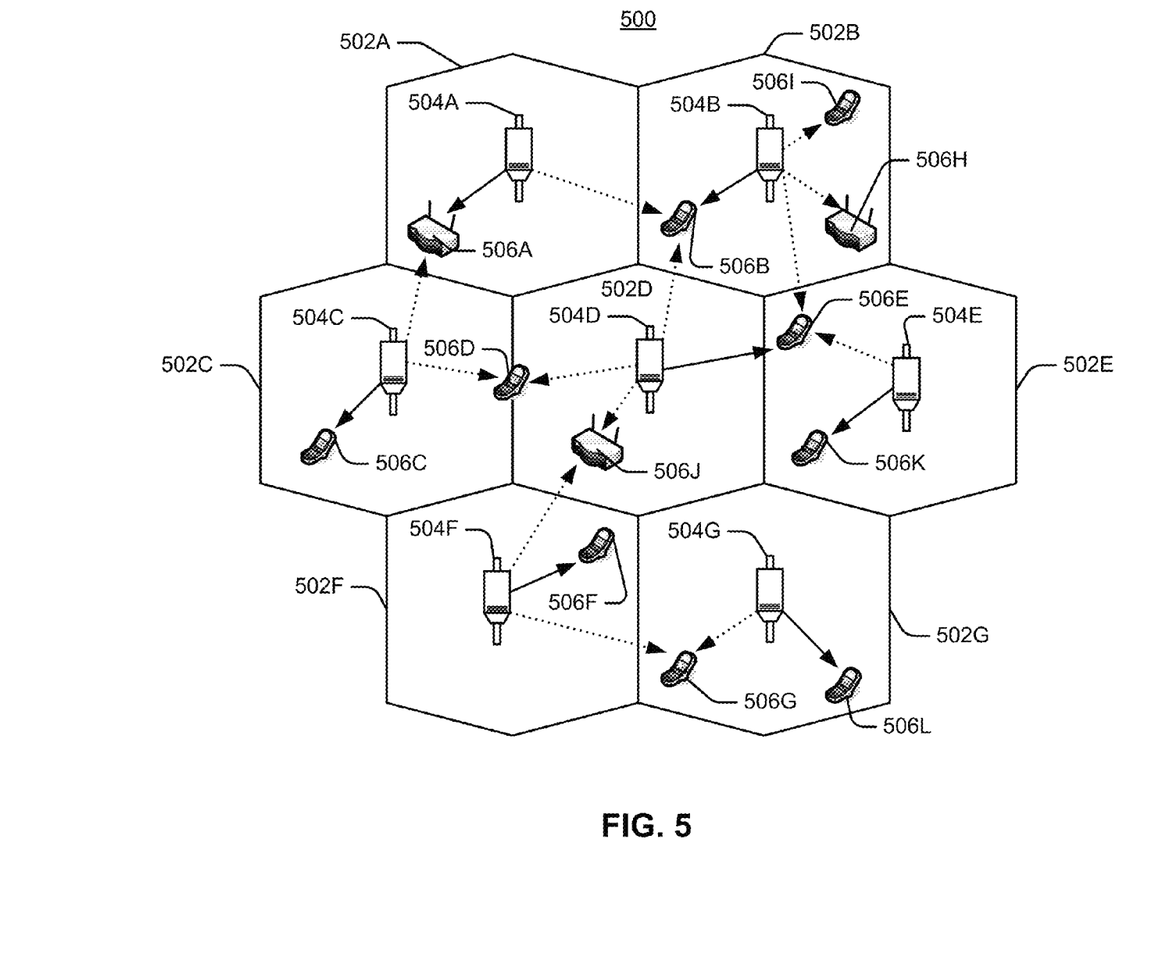
FIG. 5 is a simplified diagram of a wireless communication system.

FIG. 5 illustrates a wireless communication system 500, configured to support a number of users, in which the teachings herein may be implemented. The system 500 provides communication for multiple cells 502, such as, for example, macro cells 502A-502G, with each cell being serviced by a corresponding access point 504 (e.g., access points 504A-504G). As shown in FIG. 5, access terminals 506 (e.g., access terminals 506A-506L) may be dispersed at various locations throughout the system over time. Each access terminal 506 may communicate with one or more access points 504 on a forward link ("FL") and/or a reverse link ("RL") at a given moment, depending upon whether the access terminal 506 is active and whether it is in soft handoff, for example. The wireless communication system 500 may provide service over a large geographic region. For example, macro cells 502A-502G may cover a few blocks in a neighborhood or several miles in rural environment.

Figure 6:
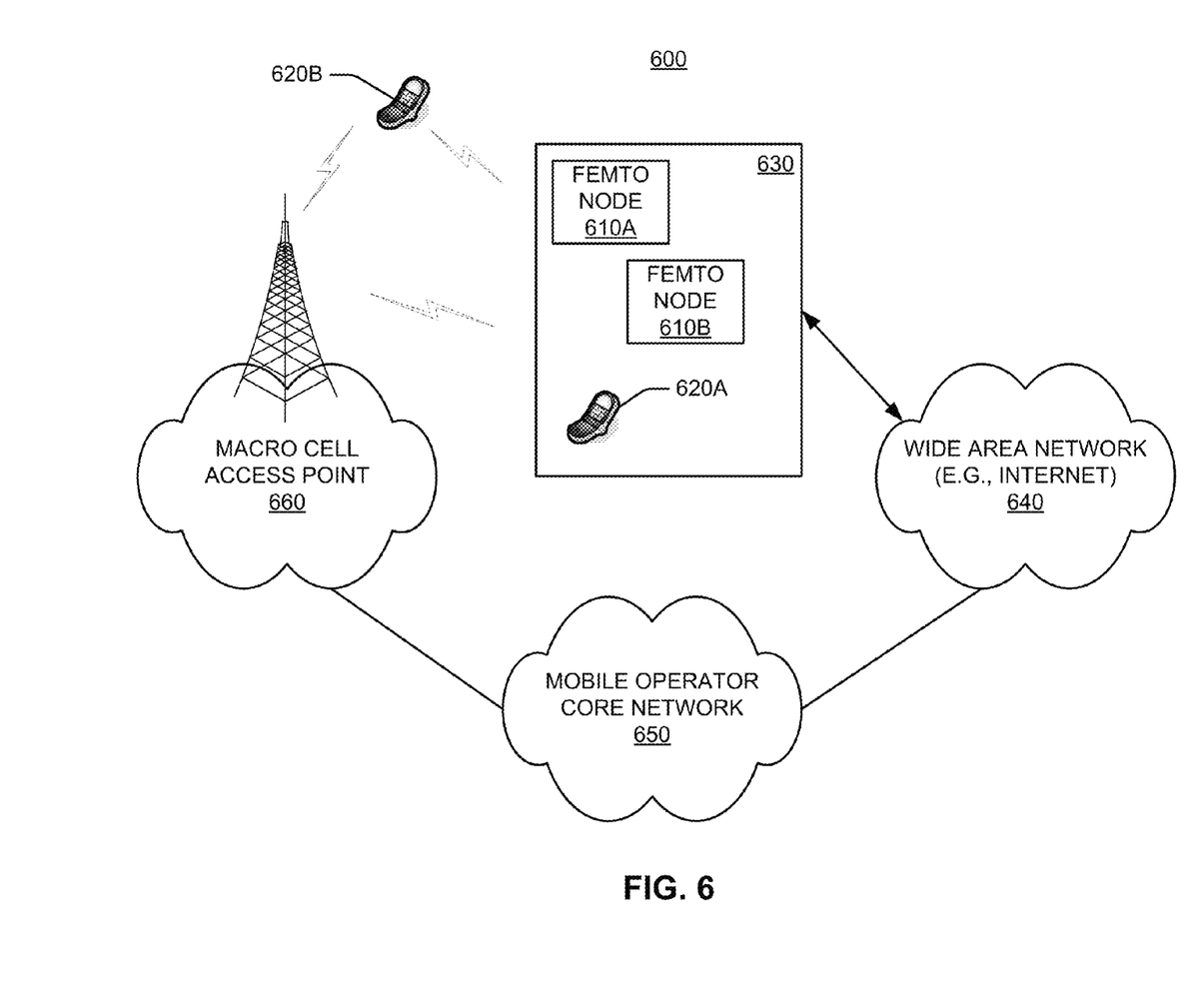
FIG. 6 is a simplified diagram of a wireless communication system including femto nodes.

FIG. 6 illustrates an exemplary communication system 600 where one or more femto nodes are deployed within a network environment. Specifically, the system 600 includes multiple femto nodes 610 (e.g., femto nodes 610A and 610B) installed in a relatively small scale network environment (e.g., in one or more user residences 630). Each femto node 610 may be coupled to a wide area network 640 (e.g., the Internet) and a mobile operator core network 650 via a DSL router, a cable modem, a wireless link, or other connectivity means (not shown). As will be discussed below, each femto node 610 may be configured to serve associated access terminals 620 (e.g., access terminal 620A) and, optionally, other (e.g., hybrid or alien) access terminals 620 (e.g., access terminal 620B). In other words, access to femto nodes 610 may be restricted whereby a given access terminal 620 may be served by a set of designated (e.g., home) femto node(s) 610 but may not be served by any non-designated femto nodes 610 (e.g., a neighbor's femto node 610).

Figure 7:
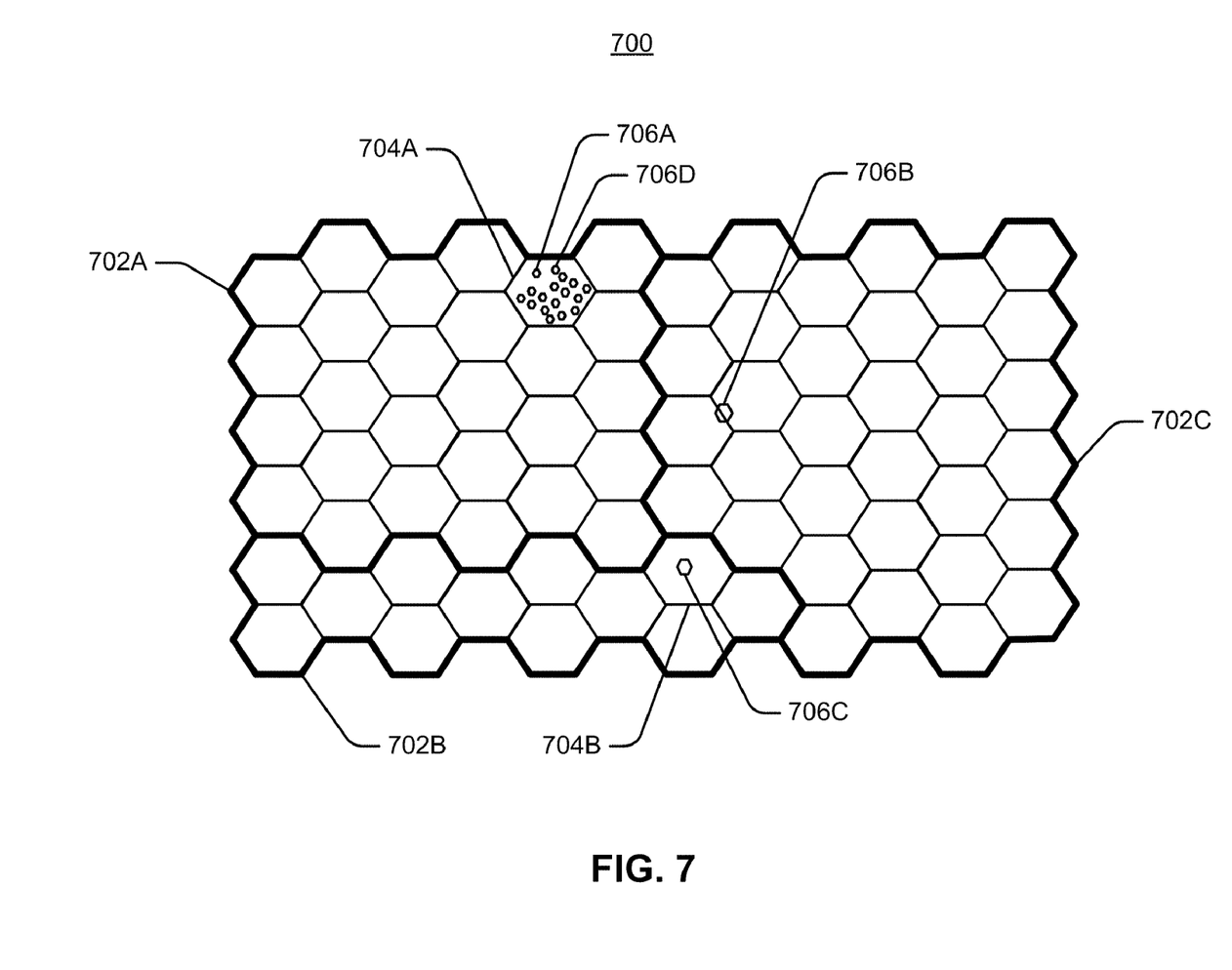
FIG. 7 is a simplified diagram illustrating coverage areas for wireless communication.

FIG. 7 illustrates an example of a coverage map 700 where several tracking areas 702 (or routing areas or location areas) are defined, each of which includes several macro coverage areas 704. Here, areas of coverage associated with tracking areas 702A, 702B, and 702C are delineated by the wide lines and the macro coverage areas 704 are represented by the larger hexagons. The tracking areas 702 also include femto coverage areas 706. In this example, each of the femto coverage areas 706 (e.g., femto coverage area 706C) is depicted within one or more macro coverage areas 704 (e.g., macro coverage area 704B). It should be appreciated, however, that some or all of a femto coverage area 706 may not lie within a macro coverage area 704. In practice, a large number of femto coverage areas 706 may be defined with a given tracking area 702 or macro coverage area 704. Also, one or more pico coverage areas (not shown) may be defined within a given tracking area 702 or macro coverage area 704.

Referring again to FIG. 6, the owner of a femto node 610 may subscribe to mobile service, such as, for example, 3G mobile service, offered through the mobile operator core network 650. In addition, an access terminal 620 may be capable of operating both in macro environments and in smaller scale (e.g., residential) network environments. In other words, depending on the current location of the access terminal 620, the access terminal 620 may be served by a macro cell access point 660 associated with the mobile operator core network 650 or by any one of a set of femto nodes 610 (e.g., the femto nodes 610A and 610B that reside within a corresponding user residence 630). For example, when a subscriber is outside his home, he is served by a standard macro access point (e.g., access point 660) and when the subscriber is at home, he is served by a femto node (e.g., node 610A).

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 610 that reside within the corresponding user residence 630). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals.

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. Each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
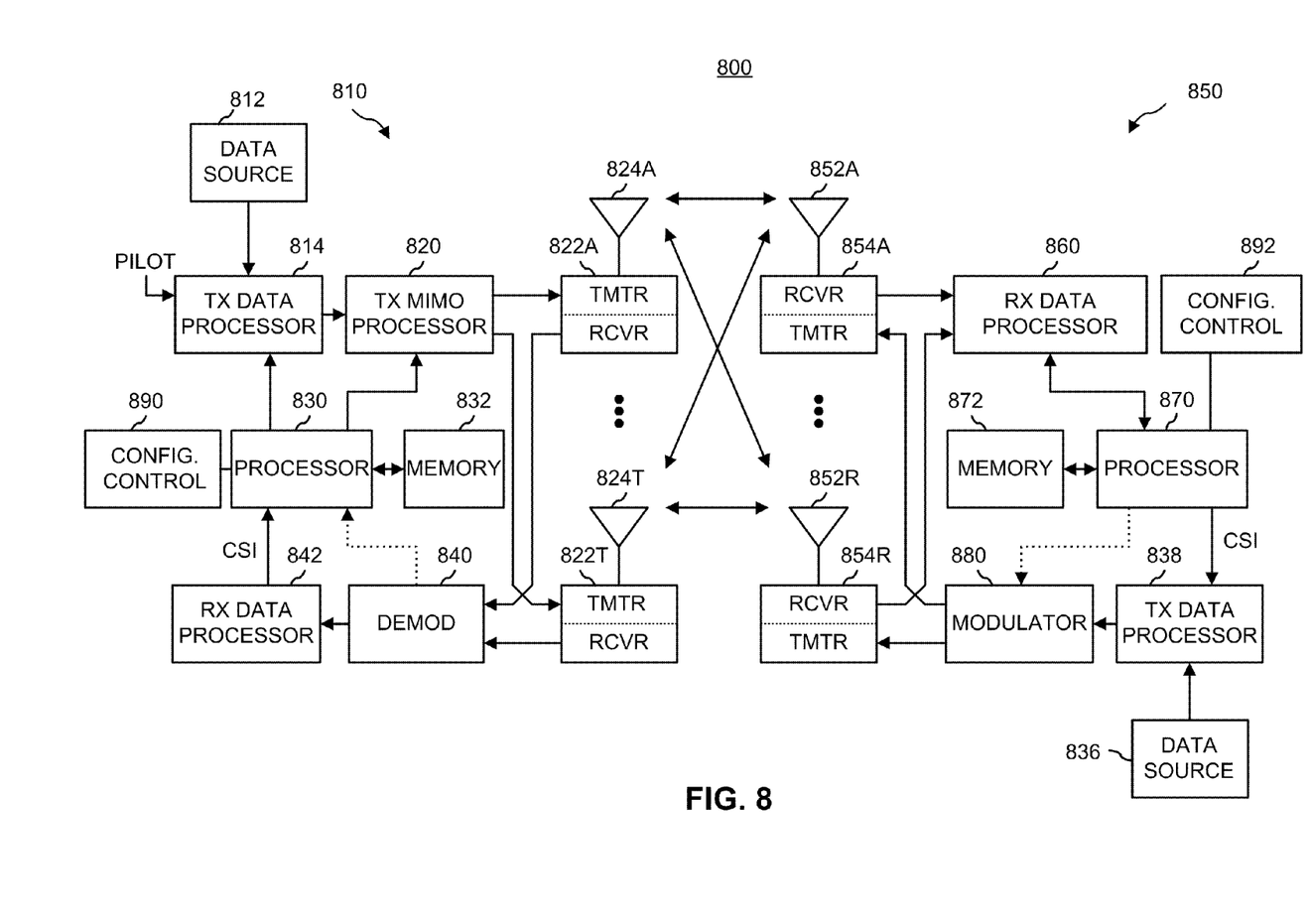
FIG. 8 is a simplified block diagram of several sample aspects of communication components.

The teachings herein may be incorporated into a node (e.g., a device) employing various components for communicating with at least one other node. FIG. 8 depicts several sample components that may be employed to facilitate communication between nodes. Specifically, FIG. 8 illustrates a wireless device 810 (e.g., an access point) and a wireless device 850 (e.g., an access terminal) of a MIMO system 800. At the device 810, traffic data for a number of data streams is provided from a data source 812 to a transmit ("TX") data processor 814.

In some aspects, each data stream is transmitted over a respective transmit antenna. The TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for OFDM). The TX MIMO processor 820 then provides $N_T$ modulation symbol streams to $N_T$ transceivers ("XCVR") 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver ("XCVR") 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive ("RX") data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use (discussed below). The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator ("DEMOD") 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform configuration control operations as taught herein. For example, a configuration (CONFIG.) control component 890 may cooperate with the processor 830 and/or other components of the device 810 to send/receive signals to/from another device (e.g., device 850) as taught herein. Similarly, a configuration control component 892 may cooperate with the processor 870 and/or other components of the device 850 to send/receive signals to/from another device (e.g., device 810). It should be appreciated that for each device 810 and 850 the functionality of two or more of the described components may be provided by a single component. For example, a single processing component may provide the functionality of the configuration control component 890 and the processor 830 and a single processing component may provide the functionality of the configuration control component 892 and the processor 870.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), a macro cell, a macro node, a Home eNB ("HeNB"), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 9:
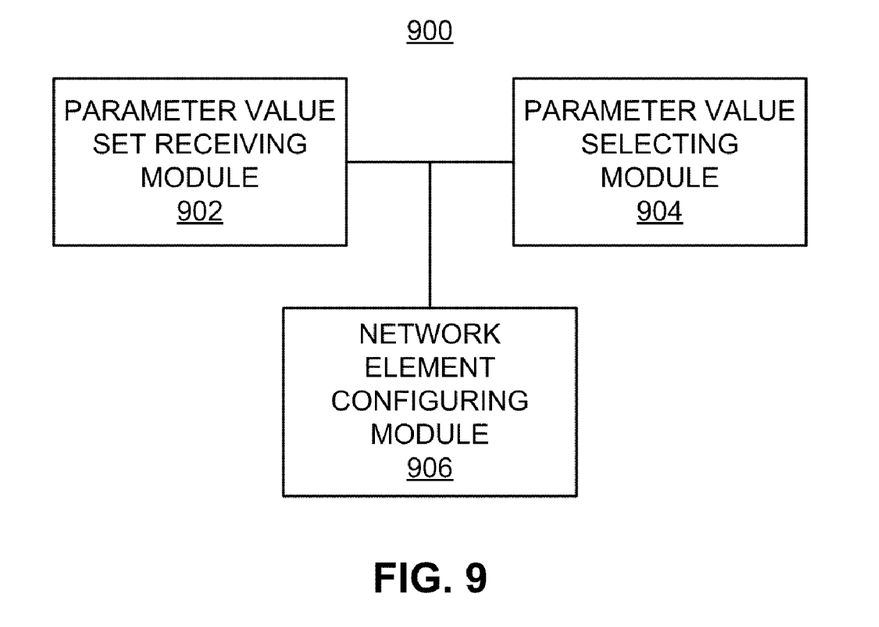
FIGS. 9 and 10 are simplified block diagrams of several sample aspects of apparatuses configured to perform network element configuration operations as taught herein.
Figure 10:
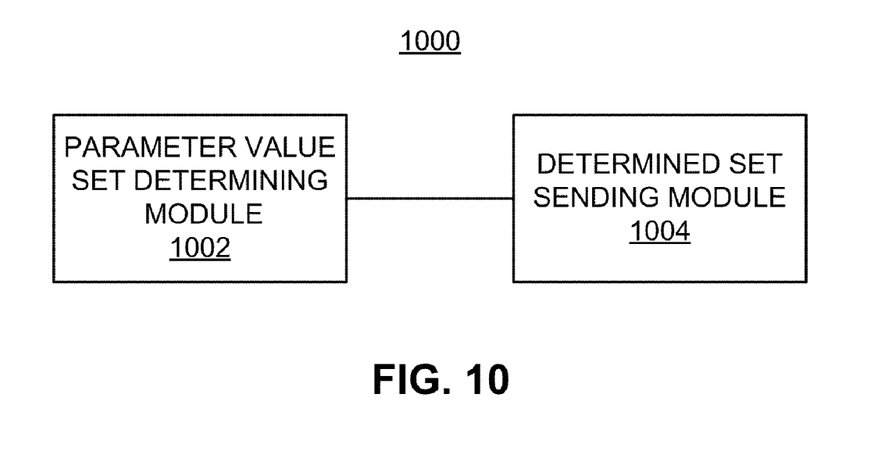

The functionality described herein (e.g., with regard to one or more of the accompanying figures) may correspond in some aspects to similarly designated "means for" functionality in the appended claims. Referring to FIGS. 9 and 10, apparatuses 900 and 1000 are represented as a series of interrelated functional modules. Here, a parameter value set receiving module 902 may correspond at least in some aspects to, for example, a communication controller as discussed herein. A parameter value set selecting module 904 may correspond at least in some aspects to, for example, a parameter selector as discussed herein. A network element configuring module 906 may correspond at least in some aspects to, for example, a configuration entity as discussed herein. A parameter value set determining module 1002 may correspond at least in some aspects to, for example, a configuration manager as discussed herein. A determined set sending module 1004 may correspond at least in some aspects to, for example, a communication controller as discussed herein.

The functionality of the modules of FIGS. 9 and 10 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A configuration method, comprising:
receiving a set of parameter values at a network element;
receiving an indication of a default parameter value of the set;
selecting a parameter value from the set at the network element, comprising:
executing an optimization algorithm in an attempt to identify a suitable parameter value from the set; and
selecting the default parameter value to provide the selected parameter value if the optimization algorithm does not identify a suitable parameter value from the set; and
configuring the network element based on the selected parameter value.

2. The method of claim 1, wherein the method is performed by an operation, administration and maintenance agent entity at the network element.

3. The method of claim 1, wherein:
the network element comprises an eNodeB; and
the set is received from an operation, administration and maintenance entity that determined the set.

4. The method of claim 1, wherein the selection of the parameter value is based on an optimization algorithm implemented at the network element.

5. The method of claim 1, wherein the set comprises a set of radio parameter values.

6. The method of claim 1, wherein the set comprises a range of parameter values.

7. The method of claim 1, further comprising:
re-executing the optimization algorithm to identify another parameter value from the set; and
reconfiguring the network element based on the identified another parameter value.

8. The method of claim 1, wherein:
the set is received from an operation, administration and maintenance entity; and
the operation, administration and maintenance entity comprises at least one configuration manager that determined the set.

9. The method of claim 8, further comprising reporting the selected parameter value to the operation, administration and maintenance entity.

10. The method of claim 8, further comprising reporting to the operation, administration and maintenance entity that the set is considered invalid by the network element.

11. A network element apparatus, comprising:
a communication controller configured to receive a set of parameter values and an indication of a default parameter value of the set;
a parameter selector configured to:
select a parameter value from the set;
execute an optimization algorithm in an attempt to identify a suitable parameter value from the set; and
select the default parameter value to provide the selected parameter value if the optimization algorithm does not identify a suitable parameter value from the set; and
a configuration entity configured to configure the network element apparatus based on the selected parameter value.

12. The apparatus of claim 11, wherein:
the network element apparatus comprises an eNodeB; and
the set is received from an operation, administration and maintenance entity that determined the set.

13. The apparatus of claim 11, wherein the parameter selector is further configured to select the parameter value based on an optimization algorithm.

14. The apparatus of claim 11, wherein the set comprises a set of radio parameter values.

15. The apparatus of claim 11, wherein:
the parameter selector is further configured to re-execute the optimization algorithm to identify another parameter value from the set; and
the configuration entity is further configured to reconfigure the network element based on the identified another parameter value.

16. A network element apparatus, comprising:
means for receiving a set of parameter values and an indication of a default parameter value of the set;
means for selecting a parameter value from the set, comprising:
means for executing an optimization algorithm in an attempt to identify a suitable parameter value from the set; and
means for selecting the default parameter value to provide the selected parameter value if the optimization algorithm does not identify a suitable parameter value from the set; and
means for configuring the network element apparatus based on the selected parameter value.

17. The apparatus of claim 16, wherein:
the network element apparatus comprises an eNodeB; and
the set is received from an operation, administration and maintenance entity that determined the set.

18. The apparatus of claim 16, wherein the means for selecting is configured to select the parameter value based on an optimization algorithm.

19. The apparatus of claim 16, wherein the set comprises a set of radio parameter values.

20. The apparatus of claim 16, wherein:
the means for selecting is configured to re-execute the optimization algorithm to identify another parameter value from the set; and
the means for configuring is configured to reconfigure the network element based on the identified another parameter value.

21. A computer-program product, comprising:
a non-transitory computer-readable medium comprising code for causing a computer to:
receive a set of parameter values at a network element;
receive an indication of a default parameter value of the set;
select a parameter value from the set at the network element, comprising:
executing an optimization algorithm in an attempt to identify a suitable parameter value from the set; and
selecting the default parameter value to provide the selected parameter value if the optimization algorithm does not identify a suitable parameter value from the set; and
configure the network element based on the selected parameter value.

22. The computer-program product of claim 21, wherein:
the network element comprises an eNodeB; and
the set is received from an operation, administration and maintenance entity that determined the set.

23. The computer-program product of claim 21, wherein the non-transitory computer-readable medium further comprises code for causing the computer to select the parameter value based on an optimization algorithm.

24. A configuration method, comprising:
determining a set of at least one parameter value from a set of operable parameter values at a network management entity;
identifying a default parameter value of the determined set; and
sending the determined set including an indication of the default parameter value to a network element to enable the network element to select a parameter value from the determined set, wherein the default parameter value is selected by the network element if an optimization algorithm does not identify a suitable parameter value from the determined set.

25. The method of claim 24, wherein the network management entity comprises a domain management entity.

26. The method of claim 24, wherein the network management entity manages at least one domain management entity.

27. The method of claim 24, wherein the determination of the set of at least one parameter value involves the network management entity:
sending a request to another entity for the set of at least one parameter value; and
receiving the set of at least one parameter value from the another entity.

28. The method of claim 24, wherein:
the network management entity comprises an operation, administration and maintenance entity; and
the network element comprises an eNodeB.

29. The method of claim 24, wherein the determined set is a portion of the set of operable parameter values.

30. The method of claim 24, wherein the determined set specifies a single parameter value.

31. The method of claim 24, wherein the determined set comprises a set of radio parameter values.

32. The method of claim 24, wherein the determined set comprises a range of parameter values.

33. The method of claim 24, further comprising receiving a report of a selected parameter value from the network element.

34. The method of claim 24, further comprising:
receiving a report from the network element that indicates that the determined set is considered invalid by the network element;
determining another set of at least one parameter value from the set of operable parameter values; and
sending the another determined set to the network element.

35. A network management apparatus, comprising:
a configuration manager configured to determine a set of at least one parameter value from a set of operable parameter values, and identify a default parameter value of the determined set; and
a communication controller configured to send the determined set including an indication of the default parameter value to a network element to enable the network element to select a parameter value from the determined set, wherein the default parameter value is selected by the network element if an optimization algorithm does not identify a suitable parameter value from the determined set.

36. The apparatus of claim 35, wherein:
the network management apparatus comprises an operation, administration and maintenance entity; and
the network element comprises an eNodeB.

37. The apparatus of claim 35, wherein the determined set is a portion of the set of operable parameter values.

38. The apparatus of claim 35, wherein the determined set comprises a set of radio parameter values.

39. A network management apparatus, comprising:
means for determining a set of at least one parameter value from a set of operable parameter values, comprising means for identifying a default parameter value of the determined set; and
means for sending the determined set including an indication of the default parameter value to a network element to enable the network element to select a parameter value from the determined set, wherein the default parameter value is selected by the network element if an optimization algorithm does not identify a suitable parameter value from the determined set.

40. The apparatus of claim 39, wherein:
the network management apparatus comprises an operation, administration and maintenance entity; and
the network element comprises an eNodeB.

41. The apparatus of claim 39, wherein the determined set is a portion of the set of operable parameter values.

42. The apparatus of claim 39, wherein the determined set comprises a set of radio parameter values.

43. A computer-program product, comprising:
a non-transitory computer-readable medium comprising code for causing a computer to:
determine a set of at least one parameter value from a set of operable parameter values at a network management entity;
identify a default parameter value of the determined set; and
send the determined set including an indication of the default parameter value to a network element to enable the network element to select a parameter value from the determined set, wherein the default parameter value is selected by the network element if an optimization algorithm does not identify a suitable parameter value from the determined set.

44. The computer-program product of claim 43, wherein:
the network management entity comprises an operation, administration and maintenance entity; and
the network element comprises an eNodeB.

45. The computer-program product of claim 43, wherein the determined set is a portion of the set of operable parameter values.

* * * * *